United States Patent
Morin

(10) Patent No.: US 8,892,121 B2
(45) Date of Patent: *Nov. 18, 2014

(54) DEVICE BASED TRIGGER FOR LOCATION PUSH EVENT

(75) Inventor: Drew Morin, Davidsonville, MD (US)

(73) Assignee: TeleCommunication Systems, Inc., Annapolis, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 13/349,951

(22) Filed: Jan. 13, 2012

(65) Prior Publication Data

US 2012/0108265 A1 May 3, 2012

Related U.S. Application Data

(63) Continuation of application No. 11/544,724, filed on Oct. 10, 2006, now Pat. No. 8,099,105.

(60) Provisional application No. 60/845,527, filed on Sep. 19, 2006.

(51) Int. Cl.
*H04W 24/00* (2009.01)
*H04W 4/02* (2009.01)
*H04L 29/08* (2006.01)
*H04W 4/20* (2009.01)

(52) U.S. Cl.
CPC ............... *H04W 4/02* (2013.01); *H04W 4/027* (2013.01); *H04L 67/18* (2013.01); *H04W 4/20* (2013.01)
USPC ........................... 455/456.1; 705/26; 705/41

(58) Field of Classification Search
USPC ................... 455/456.1; 705/26, 41
See application file for complete search history.

(56) References Cited

U.S. PATENT DOCUMENTS

| 1,103,073 | A | 7/1914 | O'Connel |
| 4,494,119 | A | 1/1985 | Wimbush |
| 4,651,156 | A | 3/1987 | Martinez |
| 4,706,275 | A | 11/1987 | Kamil |
| 4,891,638 | A | 1/1990 | Davis |
| 4,891,650 | A | 1/1990 | Sheffer |
| 4,952,928 | A | 8/1990 | Carroll et al. |
| 5,014,206 | A | 5/1991 | Scribner et al. |
| 5,043,736 | A | 8/1991 | Darnell et al. |

(Continued)

OTHER PUBLICATIONS

PCT Search Report issued in PCT/US008/13690 and mailed on Jan. 29, 2009.

(Continued)

*Primary Examiner* — Chrstiopher M Brandt
*Assistant Examiner* — Joseph Dean, Jr.
(74) *Attorney, Agent, or Firm* — William H. Bollman

(57) ABSTRACT

A software LBS trigger is initiated by a wireless device to request a set of proximate location information points relating to, e.g., points of interest, location tagged blogs, etc., based on the user's current location. The LBS trigger may be initiated when the user moves, and may include speed of the user to define a proximate area within which the user's device will be presented with relevant location information upon reaching. The size of the proximate area may be based on available memory in the wireless device, and/or on network bandwidth limitations. If walking, a smaller proximate area is defined, or if moving fast, the area of close proximity is larger. The location-based information points are stored locally on the user's device, and presentation to the user when the user gets closely proximate to the relevant information point.

16 Claims, 14 Drawing Sheets

(56) References Cited

U.S. PATENT DOCUMENTS

| | | |
|---|---|---|
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Droro et al. |
| 5,119,104 A | 6/1992 | Heller |
| 5,144,283 A | 9/1992 | Arens et al. |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer et al. |
| 5,223,844 A | 6/1993 | Mansell et al. |
| 5,235,630 A | 8/1993 | Moodey et al. |
| 5,266,944 A | 11/1993 | Carroll et al. |
| 5,289,527 A | 2/1994 | Tiedemann, Jr. |
| 5,293,642 A | 3/1994 | Lo |
| 5,299,132 A | 3/1994 | Wortham |
| 5,325,302 A | 6/1994 | Izidon et al. |
| 5,334,974 A | 8/1994 | Simms et al. |
| 5,343,493 A | 8/1994 | Karimullah |
| 5,347,568 A | 9/1994 | Moody et al. |
| 5,351,235 A | 9/1994 | Lahtinen |
| 5,361,212 A | 11/1994 | Class et al. |
| 5,363,425 A | 11/1994 | Mufti et al. |
| 5,374,936 A | 12/1994 | Feng |
| 5,379,451 A | 1/1995 | Nakagoshi et al. |
| 5,381,338 A | 1/1995 | Wysocki et al. |
| 5,387,993 A | 2/1995 | Heller et al. |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,398,190 A | 3/1995 | Wortham |
| 5,406,614 A | 4/1995 | Hara |
| 5,418,537 A | 5/1995 | Bird |
| 5,423,076 A | 6/1995 | Westergreen et al. |
| 5,432,841 A | 7/1995 | Rimer |
| 5,434,789 A | 7/1995 | Fraker et al. |
| 5,454,024 A | 9/1995 | Lebowitz |
| 5,461,390 A | 10/1995 | Hoshen |
| 5,470,233 A | 11/1995 | Fruchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer et al. |
| 5,488,563 A | 1/1996 | Chazelle et al. |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama et al. |
| 5,519,403 A | 5/1996 | Bickley et al. |
| 5,532,690 A | 7/1996 | Hertel |
| 5,535,434 A | 7/1996 | Siddoway et al. |
| 5,539,398 A | 7/1996 | Hall et al. |
| 5,543,776 A | 8/1996 | L'Esperance et al. |
| 5,552,772 A | 9/1996 | Janky et al. |
| 5,555,286 A | 9/1996 | Tendler |
| 5,568,119 A | 10/1996 | Schipper et al. |
| 5,574,648 A | 11/1996 | Pilley |
| 5,579,372 A | 11/1996 | Astrom |
| 5,588,009 A | 12/1996 | Will |
| 5,590,417 A | 12/1996 | Rydbeck |
| 5,592,535 A | 1/1997 | Klotz |
| 5,604,486 A | 2/1997 | Lauro |
| 5,606,313 A | 2/1997 | Allen et al. |
| 5,606,850 A | 3/1997 | Nakamura |
| 5,610,815 A | 3/1997 | Gudat et al. |
| 5,614,890 A | 3/1997 | Fox |
| 5,615,116 A | 3/1997 | Gudat et al. |
| 5,621,793 A | 4/1997 | Bednarek et al. |
| 5,628,051 A | 5/1997 | Salin |
| 5,633,912 A | 5/1997 | Tsoi |
| 5,673,306 A | 9/1997 | Amadon et al. |
| 5,682,600 A | 10/1997 | Salin |
| 5,692,037 A | 11/1997 | Friend |
| 5,694,546 A | 12/1997 | Reisman |
| 5,724,667 A | 3/1998 | Furuno |
| 5,740,534 A | 4/1998 | Ayerst et al. |
| 5,761,618 A | 6/1998 | Lynch et al. |
| 5,767,795 A | 6/1998 | Schaphorst |
| 5,768,509 A | 6/1998 | Gunluk |
| 5,774,533 A | 6/1998 | Patel |
| 5,787,357 A | 7/1998 | Salin |
| 5,794,142 A | 8/1998 | Vantilla et al. |
| 5,797,091 A | 8/1998 | Clise et al. |
| 5,797,094 A | 8/1998 | Houde et al. |
| 5,797,096 A | 8/1998 | Lupien et al. |
| 5,802,492 A | 9/1998 | DeLorme et al. |
| 5,806,000 A | 9/1998 | Vo et al. |
| 5,822,700 A | 10/1998 | Hult et al. |
| 5,828,740 A | 10/1998 | Khuc et al. |
| 5,867,495 A | 2/1999 | Elliott et al. |
| 5,905,736 A | 5/1999 | Rohen et al. |
| 5,920,821 A | 7/1999 | Seazholtz et al. |
| 5,930,701 A | 7/1999 | Skog |
| 5,943,399 A | 8/1999 | Bannister et al. |
| 5,946,629 A | 8/1999 | Sawyer et al. |
| 5,946,630 A | 8/1999 | Willars et al. |
| 5,949,326 A | 9/1999 | Wicks et al. |
| 5,950,130 A | 9/1999 | Coursey |
| 5,953,398 A | 9/1999 | Hill |
| 5,960,074 A | 9/1999 | Clark |
| 5,966,663 A | 10/1999 | Gleason |
| 5,974,054 A | 10/1999 | Couts et al. |
| 5,978,685 A | 11/1999 | Laiho |
| 5,987,323 A | 11/1999 | Huotari |
| 5,999,811 A | 12/1999 | Molne |
| 6,035,025 A | 3/2000 | Hanson |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen et al. |
| 6,075,982 A | 6/2000 | Donovan et al. |
| 6,078,583 A | 6/2000 | Takahara |
| 6,081,508 A | 6/2000 | West et al. |
| 6,101,378 A | 8/2000 | Barabash et al. |
| 6,122,503 A | 9/2000 | Daly |
| 6,122,520 A | 9/2000 | Want et al. |
| 6,148,197 A | 11/2000 | Bridges et al. |
| 6,148,198 A | 11/2000 | Anderson et al. |
| 6,149,353 A | 11/2000 | Nilsson |
| 6,169,891 B1 | 1/2001 | Gorham et al. |
| 6,173,181 B1 | 1/2001 | Losh |
| 6,178,331 B1 | 1/2001 | Holmes et al. |
| 6,181,935 B1 | 1/2001 | Gossman et al. |
| 6,185,602 B1 | 2/2001 | Bayrakeri |
| 6,188,752 B1 | 2/2001 | Lesley |
| 6,198,431 B1 | 3/2001 | Gibson |
| 6,199,045 B1 | 3/2001 | Giniger et al. |
| 6,205,330 B1 | 3/2001 | Winbladh |
| 6,208,854 B1 | 3/2001 | Roberts et al. |
| 6,223,046 B1 | 4/2001 | Hamill-Keays et al. |
| 6,226,529 B1 | 5/2001 | Bruno et al. |
| 6,249,680 B1 | 6/2001 | Wax et al. |
| 6,249,744 B1 | 6/2001 | Morita |
| 6,266,614 B1 | 7/2001 | Alumbaugh |
| 6,289,373 B1 | 9/2001 | Dezonno |
| 6,314,108 B1 | 11/2001 | Ramasubramani et al. |
| 6,317,594 B1 | 11/2001 | Gossman et al. |
| 6,327,479 B1 | 12/2001 | Mikkola |
| 6,353,614 B1 | 3/2002 | Borella et al. |
| 6,393,461 B1 | 5/2002 | Okada et al. |
| 6,396,913 B1 | 5/2002 | Perkins, III |
| 6,459,892 B2 | 10/2002 | Burgan et al. |
| 6,499,053 B1 | 12/2002 | Marquette et al. |
| 6,564,261 B1 | 5/2003 | Gudjonsson et al. |
| 6,677,894 B2 | 1/2004 | Sheynblat |
| 6,690,940 B1 | 2/2004 | Brown |
| 6,842,449 B2 | 1/2005 | Hardjono |
| 6,970,871 B1 | 11/2005 | Rayburn |
| 7,054,659 B2 | 5/2006 | Gioscia et al. |
| 7,123,874 B1 | 10/2006 | Brennan |
| 7,444,342 B1 | 10/2008 | Hall |

(56) References Cited

U.S. PATENT DOCUMENTS

| | | | |
|---|---|---|---|
| 7,522,182 B2 | 4/2009 | Bang | |
| 7,565,155 B2* | 7/2009 | Sheha et al. | 455/456.1 |
| 7,603,148 B2 | 10/2009 | Michalak | |
| 7,693,546 B1 | 4/2010 | Gioscia et al. | |
| 7,925,246 B2 | 4/2011 | McKibben | |
| 8,200,291 B2 | 6/2012 | Steinmetz | |
| 8,265,326 B2 | 9/2012 | Singh | |
| 8,284,980 B2 | 10/2012 | Parker et al. | |
| 2002/0155844 A1* | 10/2002 | Rankin et al. | 455/456 |
| 2003/0060214 A1 | 3/2003 | Hendrey | |
| 2003/0157942 A1 | 8/2003 | Osmo | |
| 2003/0169881 A1 | 9/2003 | Niedermeyer | |
| 2003/0220835 A1 | 11/2003 | Barnes, Jr. | |
| 2004/0077359 A1 | 4/2004 | Bernas | |
| 2004/0137921 A1 | 7/2004 | Valloppillil | |
| 2004/0203863 A1* | 10/2004 | Huomo | 455/456.1 |
| 2004/0203900 A1 | 10/2004 | Cedervall | |
| 2004/0209594 A1 | 10/2004 | Naboulsi | |
| 2005/0079877 A1* | 4/2005 | Ichimura | 455/456.1 |
| 2005/0149430 A1 | 7/2005 | Williams | |
| 2005/0197775 A1* | 9/2005 | Smith | 702/3 |
| 2005/0277432 A1 | 12/2005 | Viana | |
| 2005/0282518 A1 | 12/2005 | D'Evelyn | |
| 2006/0003775 A1 | 1/2006 | Bull | |
| 2006/0030350 A1* | 2/2006 | Mitchell | 455/522 |
| 2006/0058102 A1 | 3/2006 | Nguyen | |
| 2006/0109960 A1 | 5/2006 | D'Evelyn | |
| 2006/0116138 A1 | 6/2006 | Simsek | |
| 2006/0142027 A1 | 6/2006 | Krishnamurthi | |
| 2006/0202888 A1* | 9/2006 | Pitt et al. | 342/357.15 |
| 2006/0233317 A1 | 10/2006 | Coster | |
| 2007/0004424 A1 | 1/2007 | Sheen | |
| 2007/0021098 A1 | 1/2007 | Rhodes | |
| 2007/0149208 A1 | 6/2007 | Syrbe | |
| 2008/0014964 A1* | 1/2008 | Sudit et al. | 455/456.1 |
| 2008/0268769 A1 | 10/2008 | Brown | |
| 2009/0029675 A1 | 1/2009 | Steinmetz | |
| 2010/0167691 A1 | 7/2010 | Howarter | |
| 2011/0109468 A1 | 5/2011 | Hirschfeld | |
| 2012/0223134 A1 | 9/2012 | Smith | |

OTHER PUBLICATIONS

International Search Report in PCT/US2007/20207 dated Apr. 1, 2008.

International Search Report in PCT/US2007/026132 dated Jun. 6, 2008.

International Search Report in PCT/US2007/20207 dated Oct. 30, 2008.

International Search Report in PCT/US2007/21133 dated Apr. 21, 2008.

de Carla, Powering Location Based Solutions, Marketpalce, 2006, pp. 1-2.

Proximity Media, How the Bluetooth Media Server Works, Aug. 23, 2006 pp. 1-3.

PCT International Search Report (PCTUS2007/16138) and Written Opinion of International Searching Authority, Feb. 7, 2008.

Kim, J.Y., et al., "An Enhanced VoIP Emergency Services Prototype," Proceedings of the 3$^{rd}$ International ISCRAM Conference, Newark, NJ, May 2006.

* cited by examiner

SLOW MOTION SENSED

FAST MOTION SENSED

DEVICE BASED TRIGGER FOR LOCATION PUSH EVENT

This application is a continuation of U.S. patent application Ser. No. 11/544,724, entitled "Device Based Trigger for Location Push Event," filed on Oct. 10, 2006; which claims priority from U.S. Provisional Patent Appl. No. 60/845,527, filed Sep. 19, 2006, entitled "Device Based Triggered Location Push Event" to Drew Morin, the entirety of both of which is are expressly incorporated herein by reference.

BACKGROUND OF THE INVENTION

1. Field of the Invention

This invention relates to wireless telecommunication with location based services (LBS) applications, with particular relevance to the provision of local points of interest, location based advertising, location based blogs, location based commerce, etc.

2. Background of Related Art

Marketers are always trying to reach customers in new and innovative ways. To this end, certain technologies are emerging to allow targeted marketing and advertising to consumers based on their location.

For instance, a conventional Bluetooth MediaServer (available from www.wiremedia.com) distributes advertising content via Bluetooth communication to proximate wireless devices that use compatible Bluetooth wireless technology. But such systems require the relevant wireless device to get very close, i.e., within range of the given Bluetooth MediaServer transmitter. And even then, a willing customer must have a compatible Bluetooth enabled wireless devices to receive the marketing or advertising.

Other methods require a user to directly input their location into a web page via a computer browser application, e.g., Internet based advertising systems (e.g., a Google search). The search engine web page (e.g., Google) provides results of the search, together with location-specific sponsored advertising based on a zip code entered by a user. This method requires the user to have a browser-capable device, to manually enter their own location in very broad terms (e.g., zip code), and depends upon the user to not make an input mistake.

There is a need for a method and apparatus for sending marketing, advertising, blogs, etc. information directed to relevant users based on their location, without unduly burdening a relevant wireless network.

SUMMARY OF THE INVENTION

In accordance with the principles of the present invention, a location based service comprises a location information database comprising a plurality of location information points. A trigger response module is adapted to respond to a received location based services (LBS) trigger by obtaining proximate ones of the plurality of location information points culled into a sub-plurality corresponding to those of the plurality of location information points that are within a given proximity to a current location of a triggering wireless device. The assembled proximate location information points are downloaded to a wireless device in response to the generated LBS trigger. The trigger could come from a network element as well as from a wireless device, e.g., a registration notification to a new cell site.

A method of providing location based information to a wireless device according to another aspect comprises receiving a location based services (LBS) trigger generated by a wireless device. A current location of the wireless device is obtained. A plurality of location information points that are within a given proximity to the current location of the triggering wireless device are obtained. The plurality of location information points are downloaded to the wireless device that generated the LBS trigger.

A method of obtaining location based information for use by a wireless device according to yet another aspect comprises obtaining a current location of a wireless device. A location based services (LBS) trigger is generated. The LBS trigger is passed over a wireless network to a location information database. A plurality of location information points that are all substantially within a given range of the current location of the triggering wireless device is received.

A method of using location information points obtained by a wireless device comprise those points whose information has been downloaded based on a trigger associated with locality, velocity or some combination of other criteria. A location update is obtained at the wireless device. This location update is compared to the plurality of location information points previously downloaded using a defined set of criteria. If a match is found, an LBS trigger is generated and results in a specific action. That action could include passing the trigger or other identifying information over a wireless network to a receiving server, application or network element for further processing.

A method of using location information points obtained by a wireless device comprise those points whose information has been downloaded based on a trigger associated with locality, velocity or some combination of other criteria. A location update is obtained at the wireless device. This location update is compared to the plurality of location information points previously downloaded using a defined set of criteria. If a match is found, an LBS trigger is generated and results in the display of information downloaded with the location information point.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
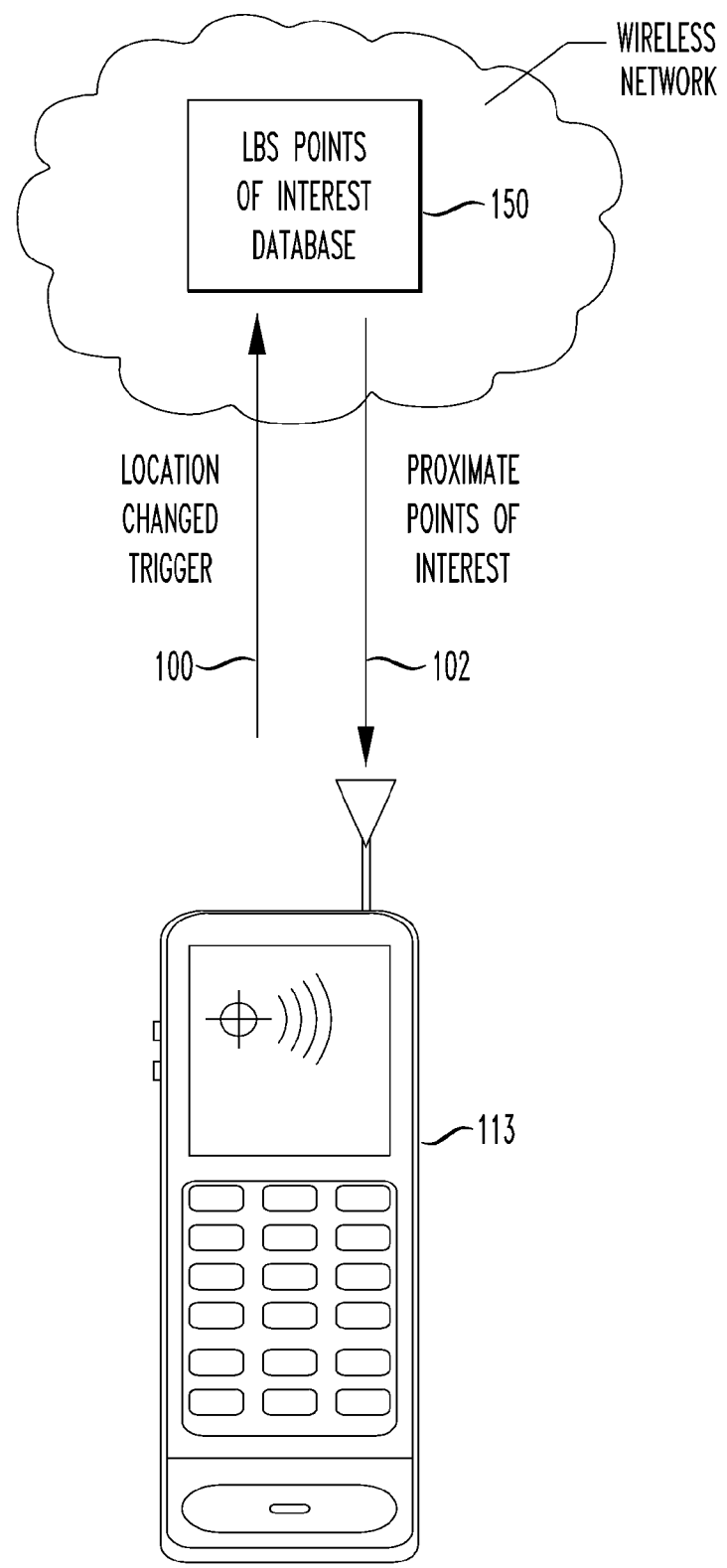
FIG. 1 depicts device based triggering of a location push event, triggering transmission of proximate points of interest within a range of the device, to the device, in accordance with the principles of the present invention.

There are multiple methods for determining precise location (e.g., assisted GPS (AGPS), Time Difference of Arrival (TDOA), etc.), some of which are network centric and some of which are device centric. The recent trend in wireless devices has been driving more and more processing power into the device. This trend has been driven by a combination of Moore's Law and the desire to continue to offer more sophisticated applications to the wireless end user. The inventor herein has appreciated that the end result will be that the device is more active and in some cases the primary engine to calculate its own precise location; it is more likely to be the source or retainer of this location information; and it is more capable of using this locally maintained location information.

Accordingly, the invention provides a method for providing location triggered information, e.g., location specific advertising, blog, video, multimedia content, web page, automatically dialed phone call, pop-up, or other relevant location-based content using a triggered push when the handset itself determines that it has reached the vicinity of a previously downloaded point of interest. The pre-fetching and queuing of points of interest location information based on general location reduces the traffic on the network associated with repeatedly communicating location for comparison to network hosted location points. The present invention leverages increased processing capacity of a wireless device coupled with the increasing role of wireless devices in determining its precise location to facilitate local, autonomous triggering of location specific events at the device.

As a device traverses a wireless network, its active connection is "handed off" between radio network communications endpoints. These endpoints can be towers for PCS, satellites for LEOs or paging networks, wireless routers for WiFi, or other radio network controller components. Regardless of the network, data is typically maintained either within the network or at the device (typically both) such that the device can be located to deliver calls, messages, data, etc. Similarly, the device retains this information such that it can provide this as part of a device endpoint specific transaction. For means of simplicity, the radio connection endpoint will be generically referred to as the "gross location". An example of this "gross location" is a cell site and sector combination for a terrestrial PCS network. An important aspect is that the device knows its location and tracks its "gross location", not just the network. In this manner, the device is capable of having a "kernel" that tracks the gross location to trigger on the change. This enables the invention to be implemented solely in software in the wireless device.

The term location based services (LBS) generally relates to consumer and commercial applications that utilize the knowledge of a wireless device user's geographic position. Location information such as street address can be entered directly by a user, but as referred to herein location based services (LBS) relates to location information that is automatically obtained electronically, e.g., using a global positioning system (GPS) in a user's wireless device such as a cell phone or personal digital assistant (PDA). Of course, other methods of precise location are possible, within the principles of the present invention.

FIG. 1 depicts device based triggering of a location push event, triggering transmission of proximate points of interest within a range of the device, to the device, in accordance with the principles of the present invention.

In particular, as shown in FIG. 1, a wireless device 113 having the ability to be located notes a change in location and generates an LBS trigger 100. The device passes the same to an appropriate location based information database 150. The gross location could also be determined by the network such as a cell site/sector hand off. In response to a triggered event on the handset, requested location information 102 (e.g., proximate points of interest) relating to the location of the handset is extracted from the location information database 150 and downloaded to the wireless device 113.

The disclosed embodiments describe use of a software LBS trigger 100 initiated by a user's wireless device 113 and passed to a network database 150. The trigger 100 may take one of two forms. The trigger 100 may request the network database 150 to provide the triggering wireless device 113 with a revised set of proximate location information points within a given region surrounding the user's wireless device 113 current location, based on the user's current location. As the user moves about, from time to time the user will download a revised set of locations of points of interest to provide a sufficient buffer around the handset's current position such that the device can move about and push triggers autonomously for a significant period of time. Alternatively, the trigger 100 may request location based information (e.g., a blog, text, pop-up, video, etc.) relating to the handset having reached a vicinity of a location information point of interest previously downloaded.

Yet another variant is also anticipated wherein the trigger requests a specific application to launch. This can be local to the device, or launched within the network. downloaded.

The location information points comprise information relevant to a particular location. They may comprise only a lat/lon of the location, and specific direction as to what to request in a location push upon reaching a vicinity of the lat/lon of the location information point. The location information point may include additional information previously downloaded to the handset, e.g., text message, video, etc. The additional information may be downloaded to the handset over time, in the background of other operations on the handset, to appear to the user to operate more smoothly.

Thus, the location information points can be abstracted to represent only the XY (latitude/longitude) of the point of interest (POI). The key is to let the handset know when it has reached a triggering location.

Location information points may be points of interest, location tagged blogs, commercial locations with advertising focused on the surrounding area serviced by that commercial location, video, multimedia, audio, a phone number to automatically dial, a web page to automatically access, a pop-up to automatically present to the user, an application to launch, etc.

The LBS trigger 100 is initiated at appropriate times by the user's wireless device 113 in response to its detection of significant movement of the user, e.g., the mover is walking, driving, etc. as detected by a locating device (e.g., GPS). The LBS trigger 100 may of course be initiated at additional other times by the user's wireless device 113, e.g., at the startup of a relevant location based services application on the user's wireless device 113, etc.

The LBS trigger 100 to request a revised set of surrounding points of interest is occasionally transmitted as necessary, but preferably is transmitted only when the 'gross location' changes. The 'gross location' represents a geographic region that could be network topology driven such as a cell site and sector. If it does not change, no triggered event has occurred.

Sufficient location based information is returned by the network database 150 to the triggering wireless device 113, such that the triggering wireless device 113 will receive and buffer location based lat/lon information (and potentially content to be presented to the user upon reaching a vicinity of that lat/lon) relating to areas that the wireless device 113 is not yet proximate to, but which the wireless device 113 may become proximate to, e.g., all of those triggered locations within the region defined as the 'gross location'. The idea is to provide the wireless device 113 with the anticipated location based information that it immediately needs based on proximity, both to reduce network traffic over time, as well as to provide the user with a smoother, faster operating user interface.

The location based information may be maintained and presented in pre-defined fixed grids, or it may be determined to be proximate to a user's current location on a trigger-by-trigger basis.

Figure 2:
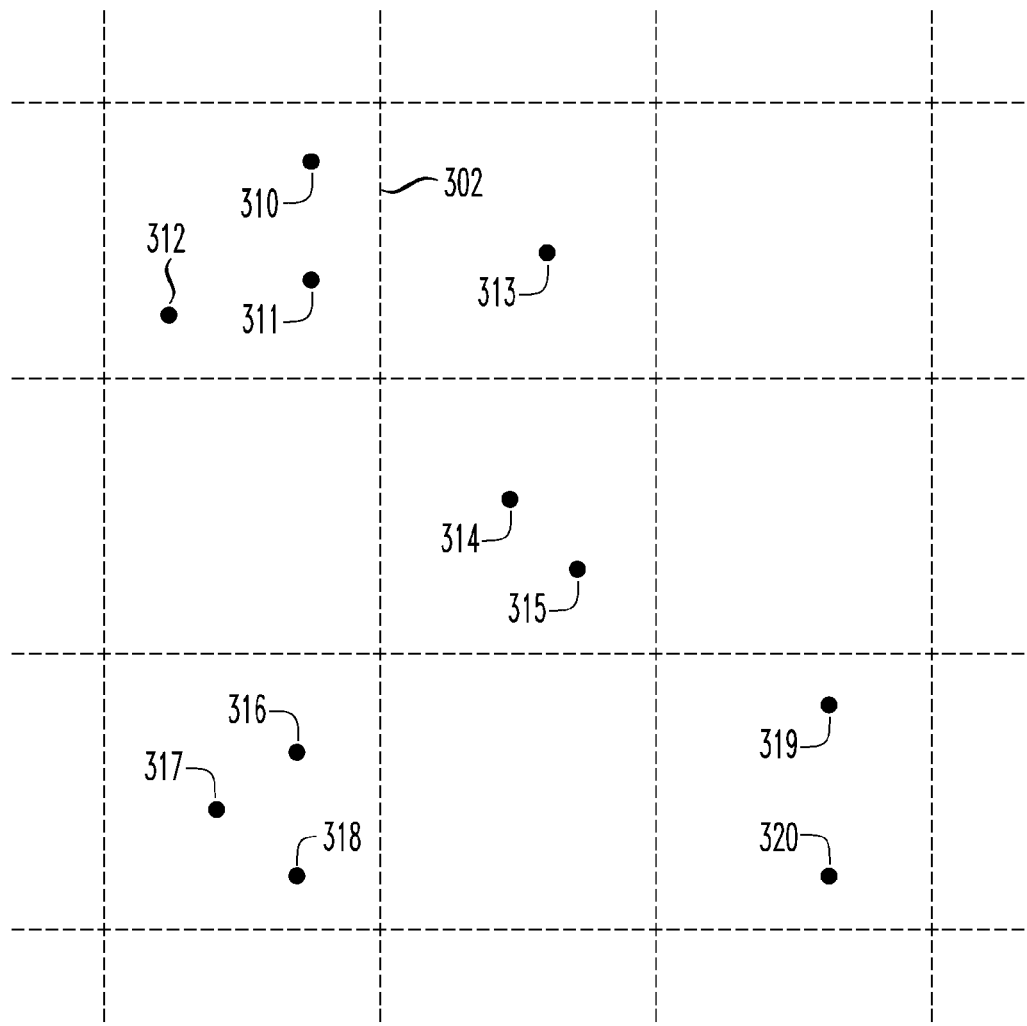
FIG. 2 shows in a first embodiment a grid of gross location areas, some (or all) of which contain one or more points of interest, in accordance with the principles of the present invention.

With respect to the use of pre-defined fixed grids, FIG. 2 shows in a first embodiment a grid of gross location areas, or ranges, some (or all) of which contain one or more points of interest, in accordance with the principles of the present invention.

In particular, as shown in FIG. 2, a given geographical area is shown graphically broken into a grid of gross location areas, or ranges. FIG. 2 is shown graphically for ease of description: the location based information may be maintained in an appropriate database in any suitable form, e.g., textual, as latitude/longitude with textual information, textual and photographic, videographic, etc.

A first range 302 shown in FIG. 2 includes three location relevant information points 310-312. For explanation, a number of ranges are shown, some of which include no information points, and others of which contain various numbers of additional information points 313-320.

The information points 310-320 each may contain location based information in any suitable electronic media form (e.g., text, photo, video, audio, short message, email, etc.), but importantly ties that information to a respective given location 310-312. The information point can be a trigger for initiating a different application on the device or in the network, as well as information such as text, photo, email, etc.

The given locations 310-312 may be an exact latitude/longitudinal point, a range of latitude/longitudinal values, or even a vectored range or geometric shape (e.g., a perimeter of a building).

Figure 3:
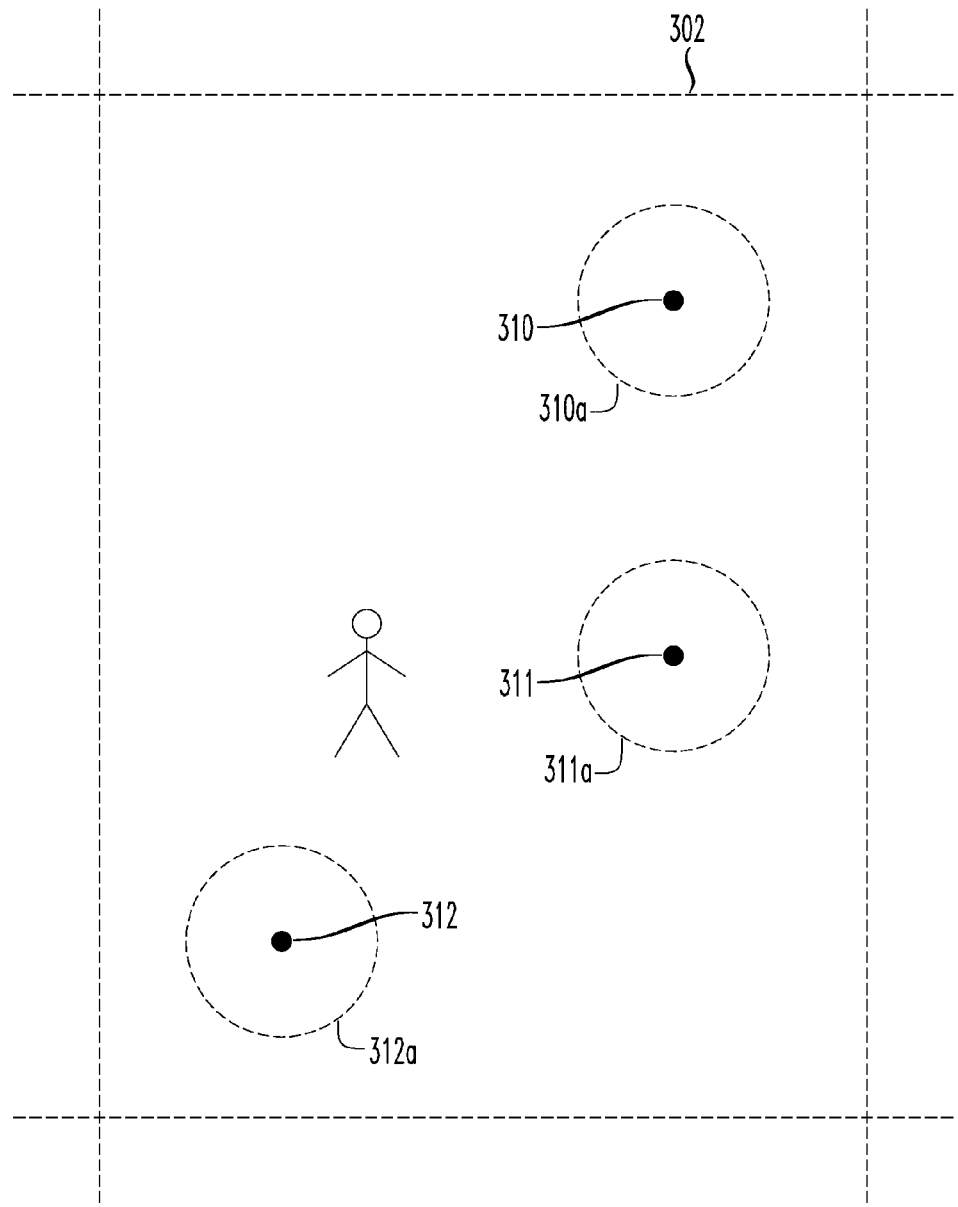
FIG. 3 shows in a first embodiment, detail of an exemplary gross location area, or range, shown in FIG. 2, with proximate areas surrounding each point of interest sized based upon a current relatively slow motion speed (e.g., walking) of the relevant device, in accordance with the principles of the present invention.

FIG. 3 shows in a first embodiment, detail of an exemplary gross location area, or range, shown in FIG. 2, with proximate areas surrounding each point of interest sized based upon a current relatively slow motion speed (e.g., walking) of the relevant device, in accordance with the principles of the present invention.

In particular, as shown in FIG. 3, the exemplary range 302 of location based information points 310-312 are shown graphically with respective proximate distances 310a-312a depicted around each location based information point 310-312. The proximate distances 310a-312a may be fixed by the network, configurable by the user or network, specific to the needs of an application (such as a walking tour guide application versus a friend finder. The tour guide wants you at a specific point while friend finder might be within a specific range.), or determined based on additional information relating to the user (e.g., their speed).

In particular, the LBS trigger 100 from the triggering wireless device 113 may include additional information relating to the user's wireless device 113 and/or location. For example, the LBS trigger 100 may include information relating to a current or recent speed of the user (e.g., a current speed, average speed, median speed, range of speed, etc.) Speed of the user information may be used to define a suitable range around the user's current location for which the triggering wireless device 113 will be presented with relevant location information. The size of the range 302 for which location information points is provided is preferably based on network topology (to minimize traffic overhead), but may also make use of additional information, as well as any relevant physical equipment limitations such as the available amount of memory in the triggering wireless device 113, network bandwidth limitations, etc.

If the user is moving slowly (e.g., walking) as depicted in FIG. 3, a smaller proximate area 310a-312a may be defined, with relevant location-based information points (e.g., triggers for either presenting previously downloaded content relating to points of interest, location tagged blogs, video, audio, pop-up, etc.) within that smaller proximate area 310a-312a being provided so that the device application can autonomously present the same to the user at an appropriate time in the future if/when the user becomes proximate to a location point 310-312 for which location information was previously obtained. On the other hand, if the user is moving fast (e.g., driving), a larger area of proximity 310b-312b may be defined (FIG. 4), as compared to a smaller area of proximity 310a-312a (FIG. 3) defined for a slow moving user (e.g., walking), providing the user with the location information for locations that are comparatively farther from the user's current location. In particular, FIG. 4 shows in detail an exemplary gross location area, or range, shown in FIG. 2, with proximate areas surrounding each point of interest sized based upon a current relatively fast motion speed (e.g., driving) of the relevant device 113, in accordance with the principles of the present invention.

Figure 4:
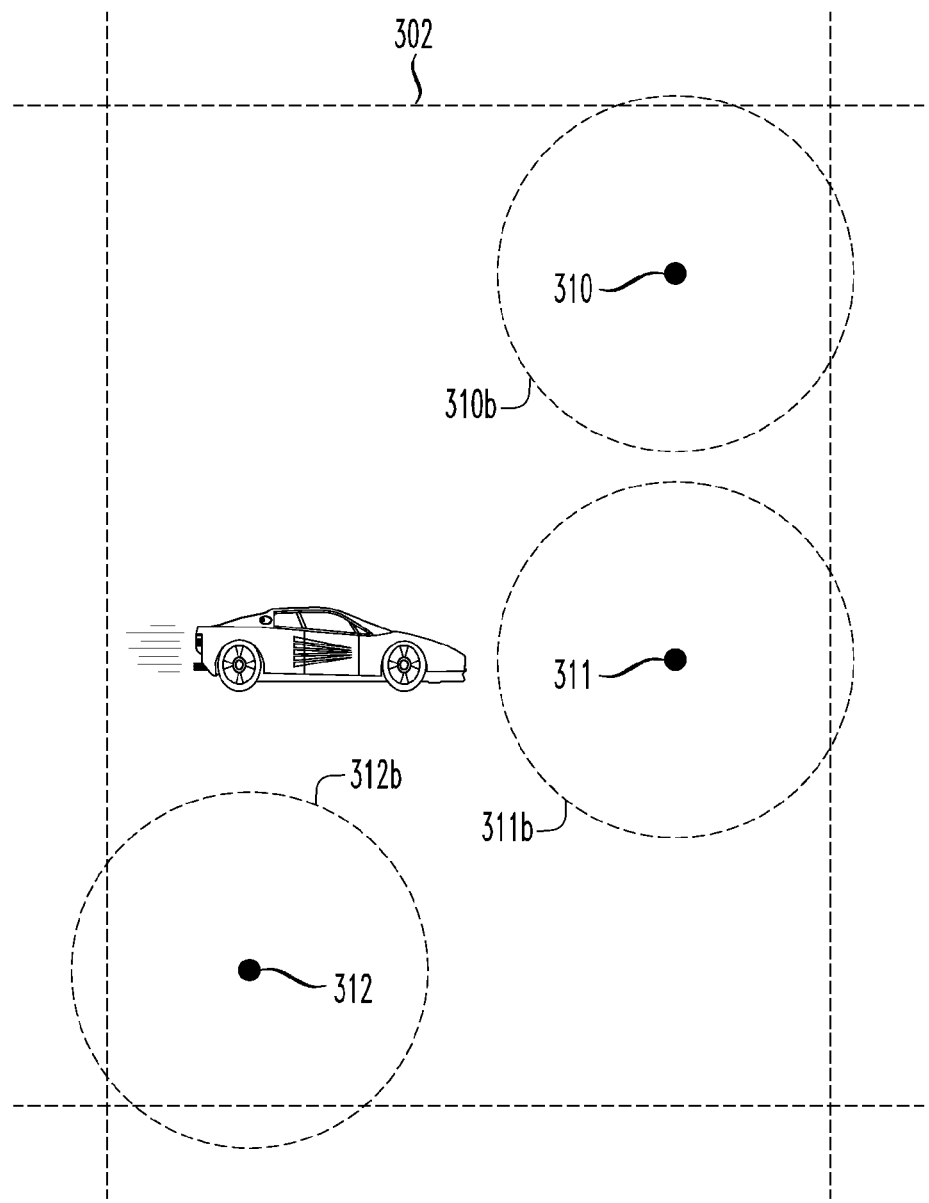
FIG. 4 shows in detail an exemplary gross location area, or range, shown in FIG. 2, with proximate areas surrounding each point of interest sized based upon a current relatively fast motion speed (e.g., driving) of the relevant device, in accordance with the principles of the present invention.

While FIGS. 3 and 4 depict modification of a range of location information point triggers based on velocity, other information may be additionally or alternatively considered. For instance, network topology of the area surrounding the user's current location may additionally or alternatively be considered. If the network is considered to be a series of overlapping cells with points of interest in each of the cells, then as a person/device traverses the cells, a handoff occurs as normal network operation. This handoff provides gross location based on network topology. Thus, speed is essential to consider since if the user/device is moving at a high rate of speed (e.g., in a car, high speed train, airplane, etc.), it may likely necessitate the delivery of location point of interest data for multiple network cells so that the handset will have previously downloaded location information point triggers relating to the multiple cells.

Importantly, the embodiments describe storage of the location-based information points 310-312 and associated location based information locally on the user's device subject to network and device limitations, and presentation of the location based information to the user when the user gets closely proximate, i.e., within the proximate area 310a-312a associated with to the respective information point 310-312. Alternatively, the downloaded and locally stored location-based information points 310-312 and associated information may comprise the location point, proximate area 310a-312a, and a reference or semaphore representing a downloaded local or network resident application to trigger based on proximity to the respective information point Location based information may alternatively be provided in a custom fashion centered on a user's current location on a trigger-by-trigger basis. For instance, FIGS. 5A to 5H show in another embodiment, detail of a proximate range 510 determined for a given wireless device 113 as it moves about. The size (and shape) of the proximate range 510 may be predetermined by the service provider or user, configured by the service provider and/or user, and/or adjusted based on current information received from the wireless device 113 (e.g., based on the speed of the wireless device 113).

For ease of description and explanation, the points of interest 310-320 are depicted in the same locations in FIGS. 5A to 5H as they were in the grid of ranges shown in FIG. 2, but without a pre-defined grid. Instead, in this embodiment, the range for which location information points are provided to the user is determined based on a current location of the wireless device 113 at the time that the LBS trigger 100 is sent.

Note that more frequent transmission of the LBS trigger 100 from the wireless device 113 will ensure that the wireless device 113 will not come upon a particular location for which location information is in the location based information database 150 but for which the wireless device 113 had not received location information relating to that location. The size of the proximate range 510 should be sized to allow the wireless device 113 a significant amount of time to move about without having to send another LBS trigger 100 in a way that it won't ordinarily be in a location outside the proximate range 510 at the time of the last download of location based information.

Figure 5A:
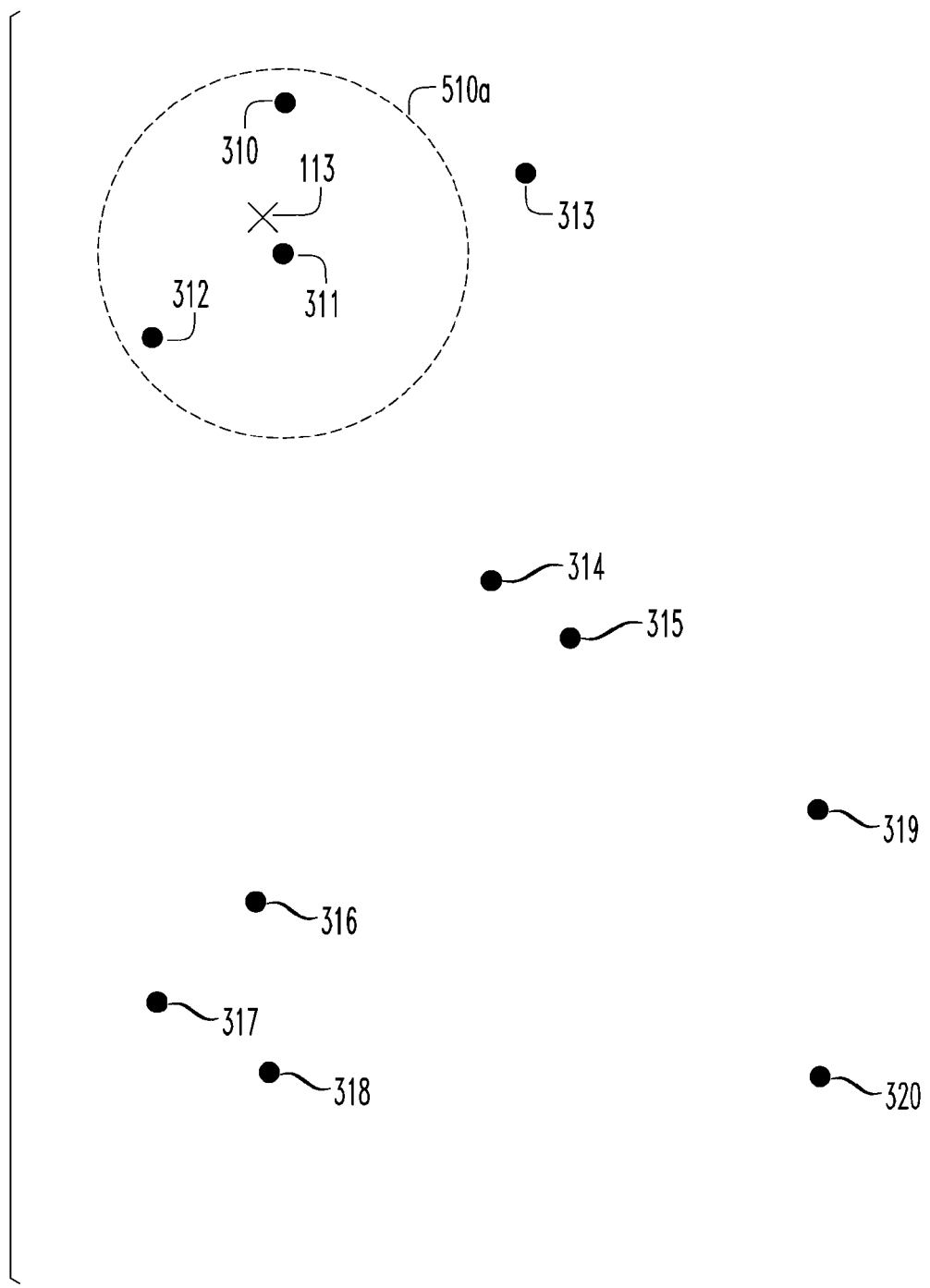
FIGS. 5A to 5H show in another embodiment, detail of gross location areas determined based on a current location of the device, and relative speed of the device (e.g., driving speed), in accordance with the principles of the present invention.

As shown in FIG. 5A, the wireless device 113 generates an LBS trigger 100, and receives location information for any/all location points within the proximate range 510a at that time. At that time, the proximate range 510a includes location points 310-312.

Figure 5B:
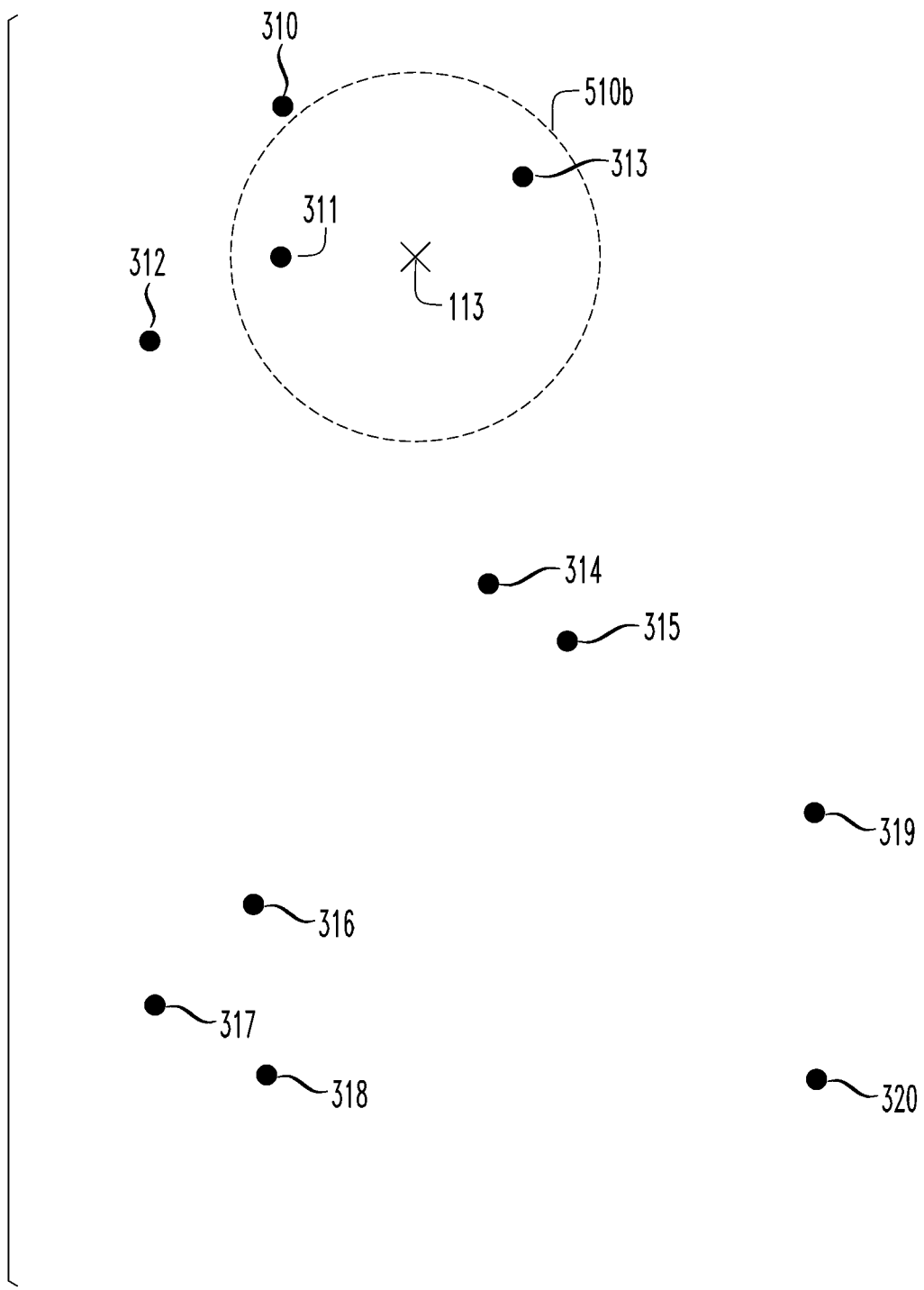

In FIG. 5B, the wireless device 113 again generates an LBS trigger 100 after having moved from its location shown in FIG. 5A. At this time, the wireless device 113 receives location information relating to location points 310, 311 and 313 contained within the proximate range 510b at the time that the LBS trigger 100 was generated.

Figure 5C:
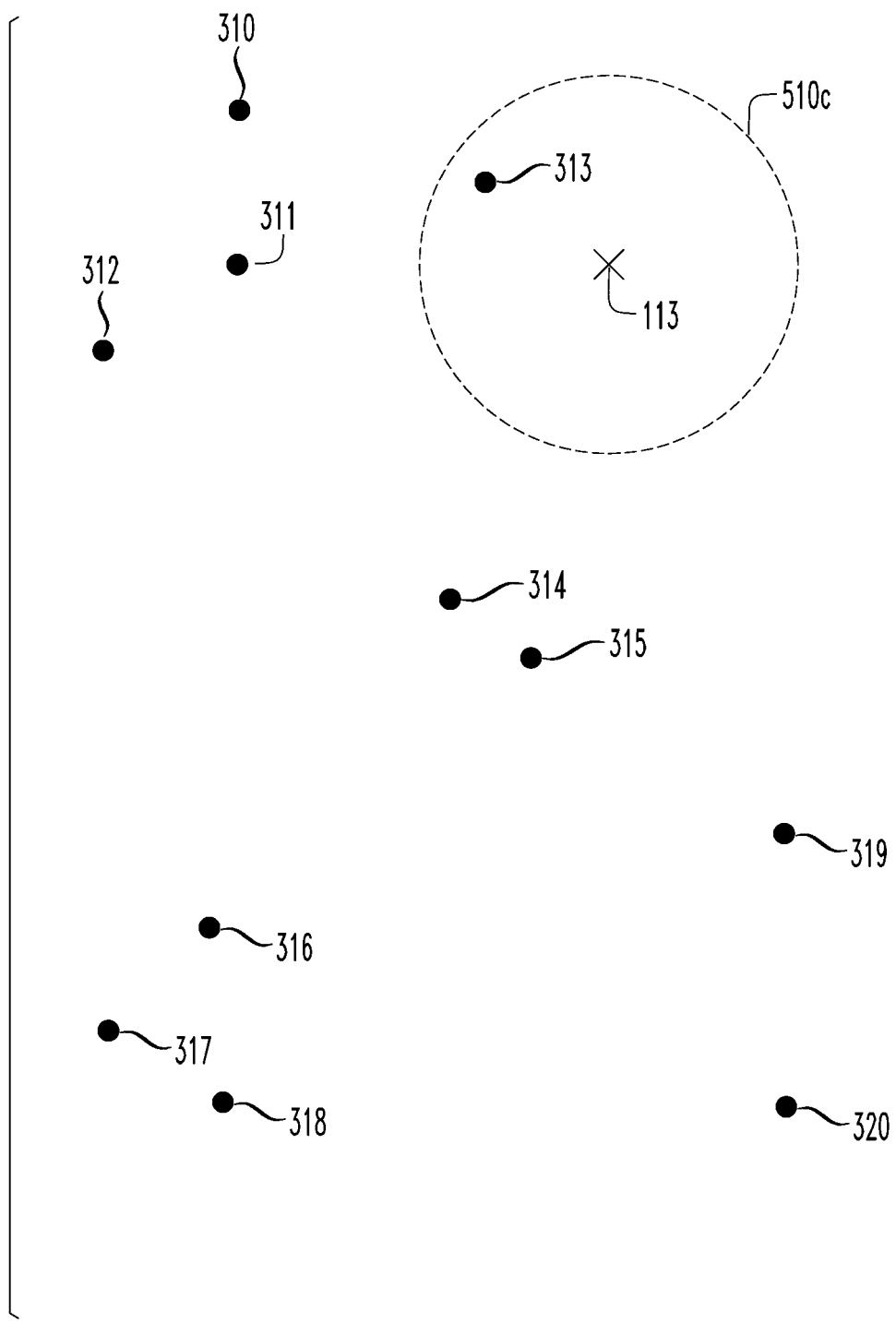

In FIG. 5C, the wireless device 113 has again moved, again generated an LBS trigger 100, and this time received location information relating to location point 313 located within the proximate range 510c.

Figure 5D:
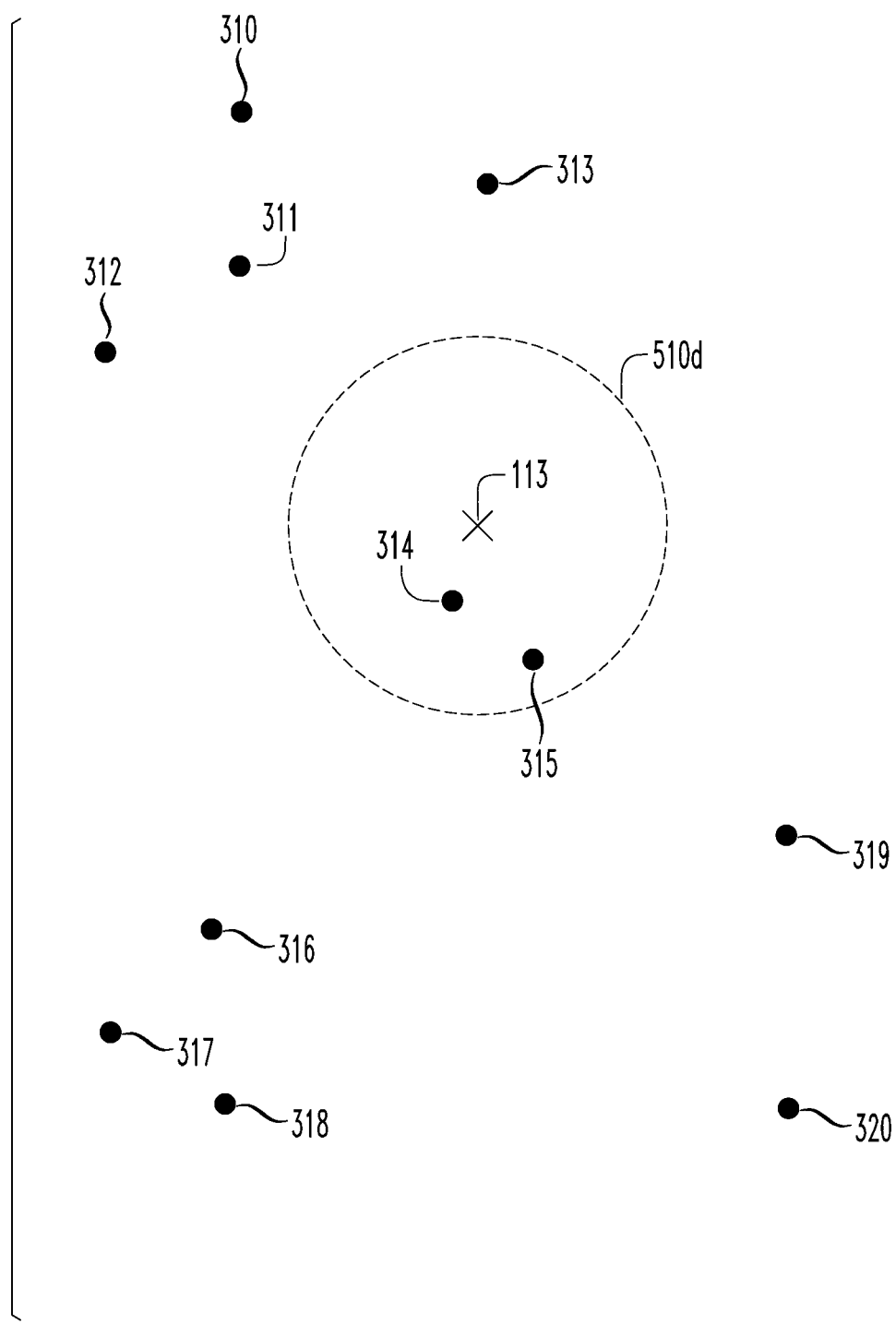

In FIG. 5D, the proximate range 510d defined at the time that yet another LBS trigger 100 is generated, includes location points 314 and 315.

Figure 5E:
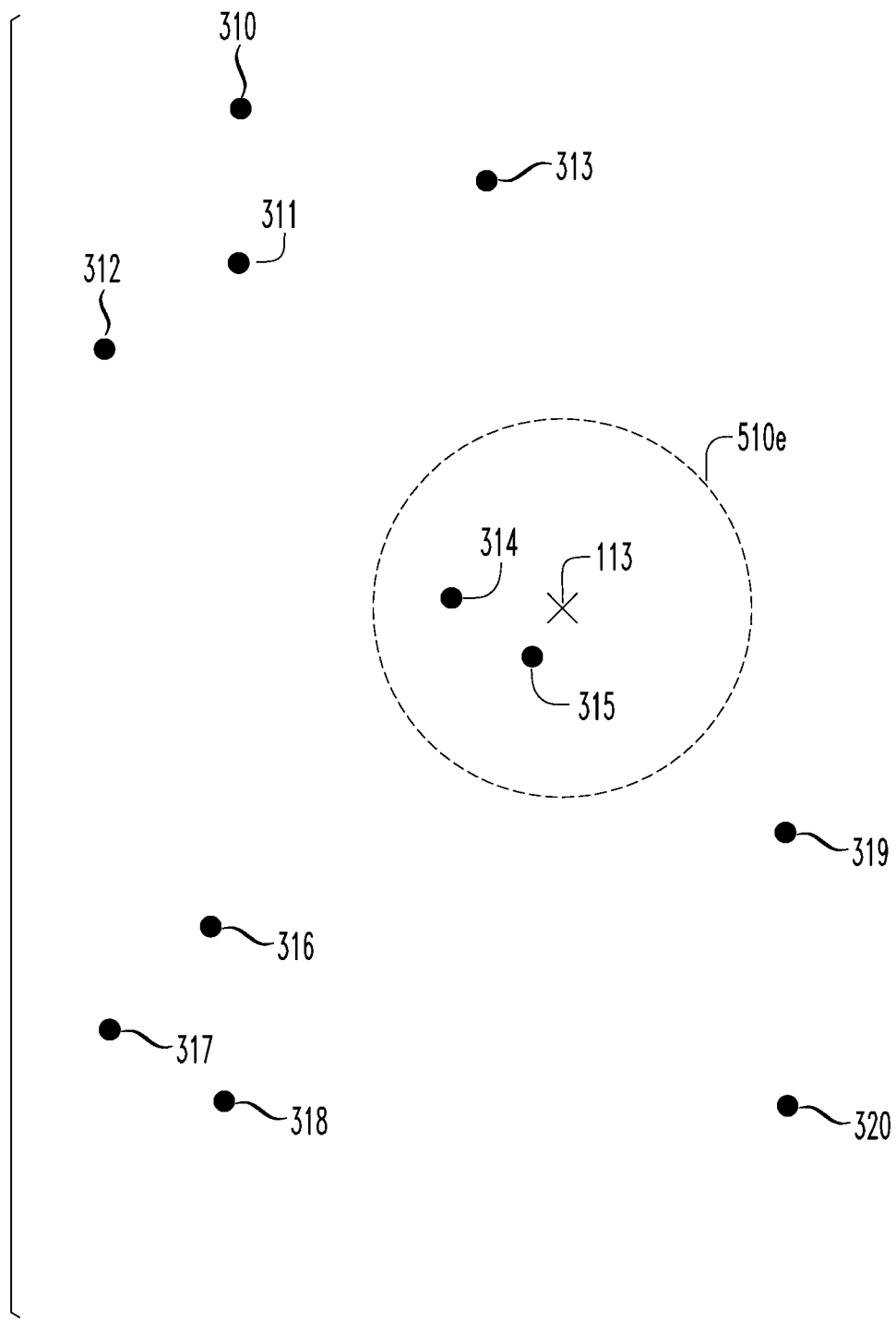

In FIG. 5E, the wireless device 113 has moved south, has generated another LBS trigger 100, causing the definition of a proximate range 510e including information points 314 and 315.

Figure 5F:
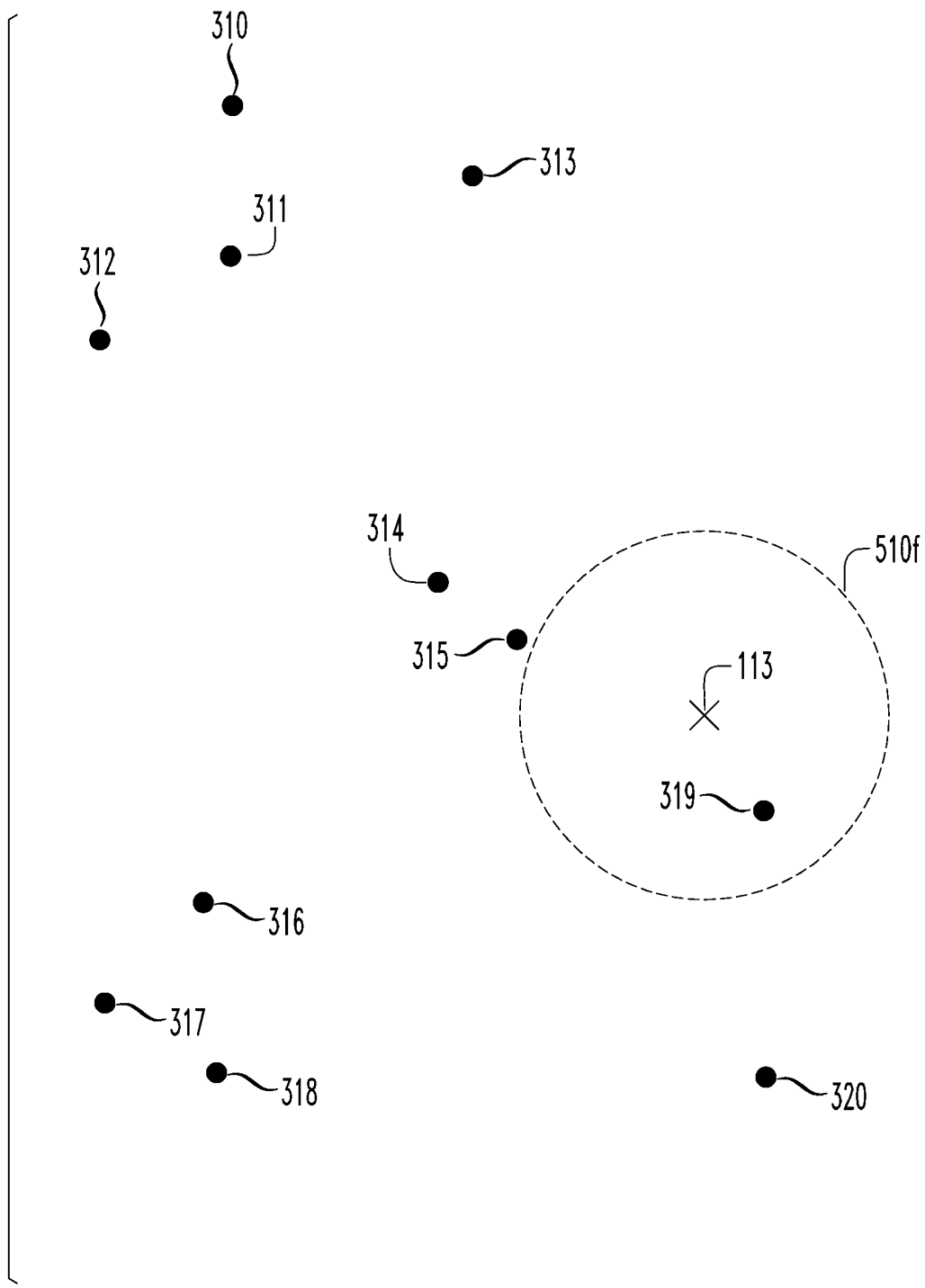

In FIG. 5F, a proximate range 510f is defined in response to another LBS trigger 100, the proximate range 510f including location point 319 only.

Figure 5G:
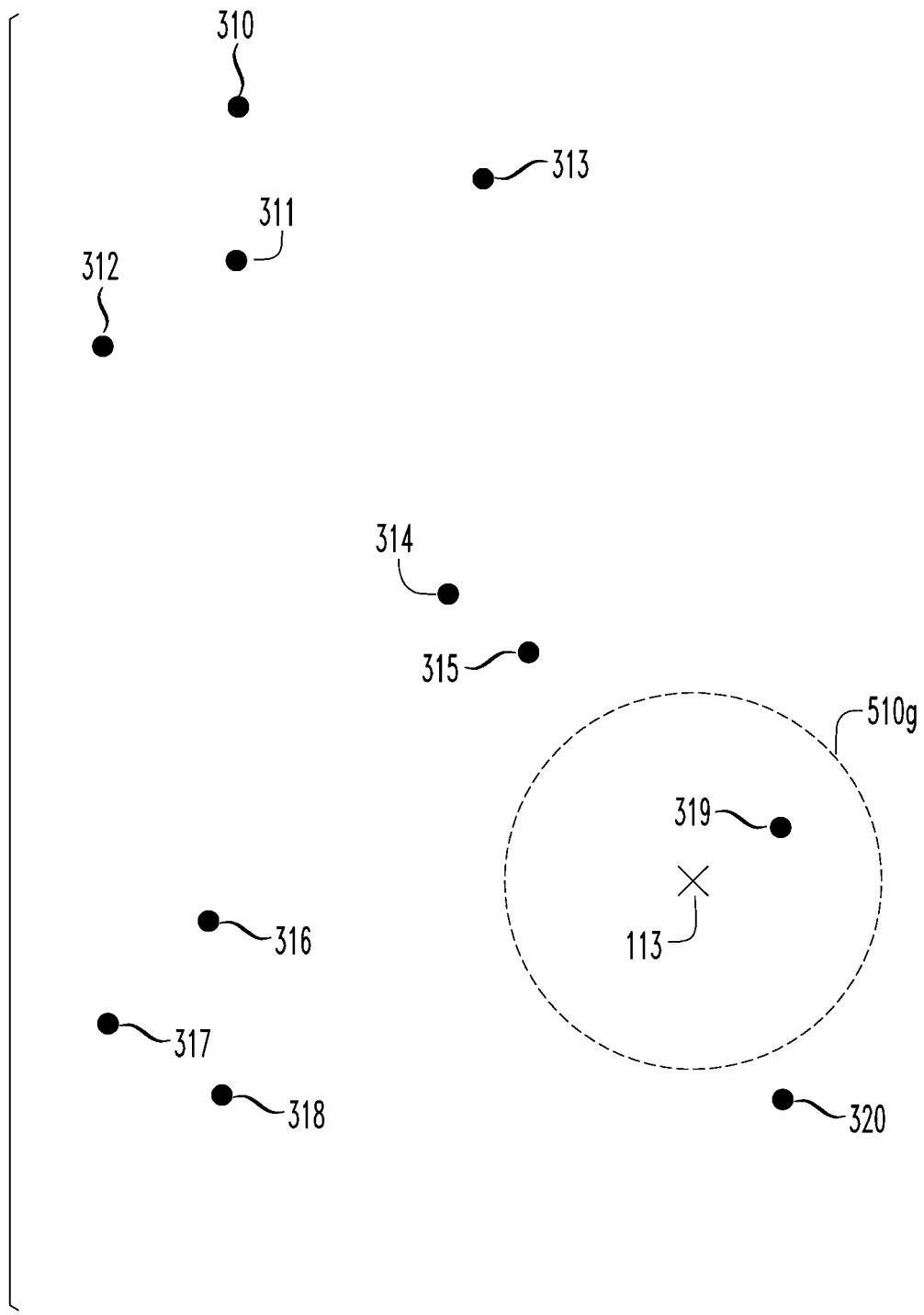

In FIG. 5G, the new proximate range 510g includes location point 319 only (again).

Figure 5H:
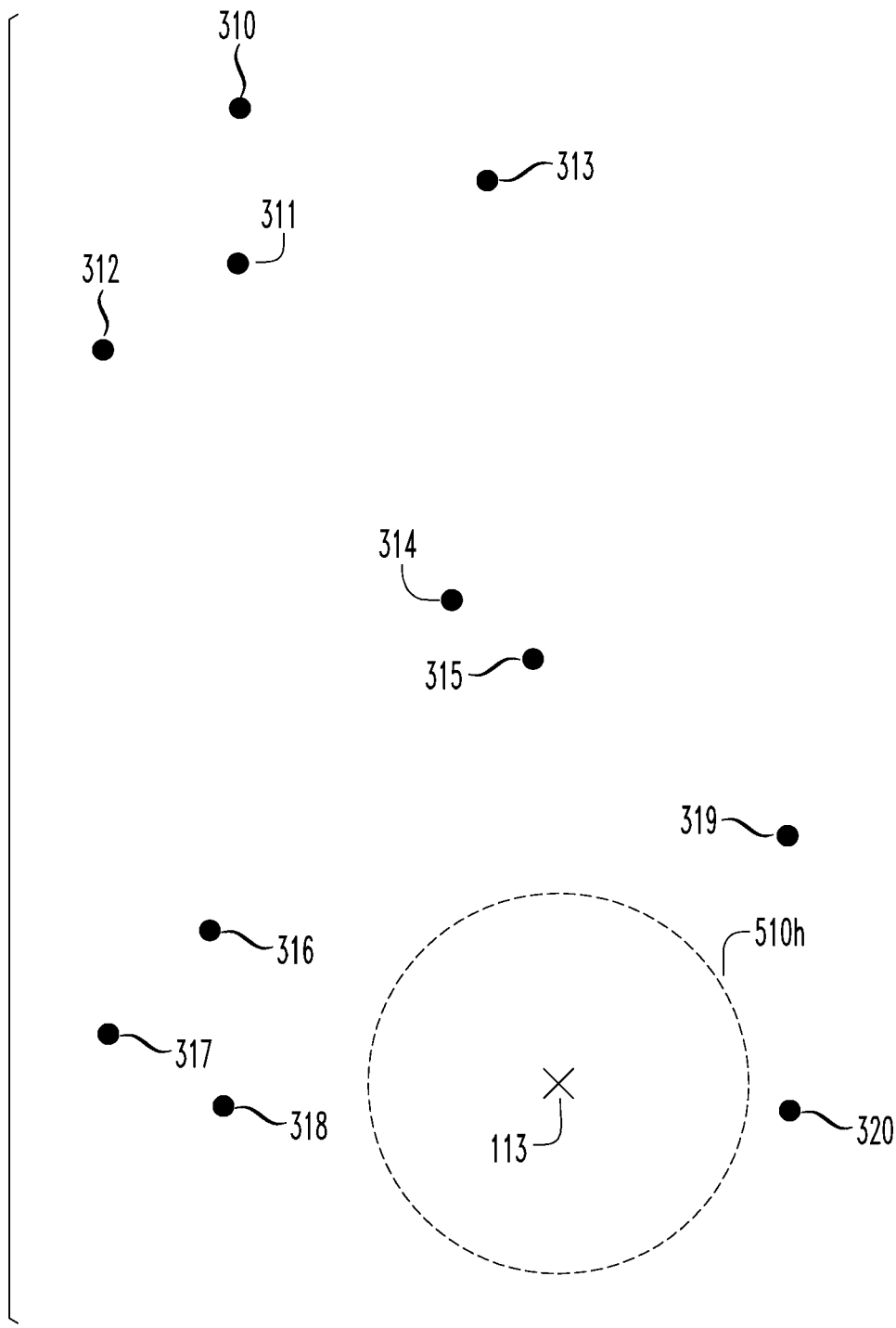

In FIG. 5H, the wireless device 113 has generated an LBS trigger 100, defining a proximate range 510h, but this time there are no location points in the database with latitude/longitude location points located within this proximate range 510h.

Figure 6:
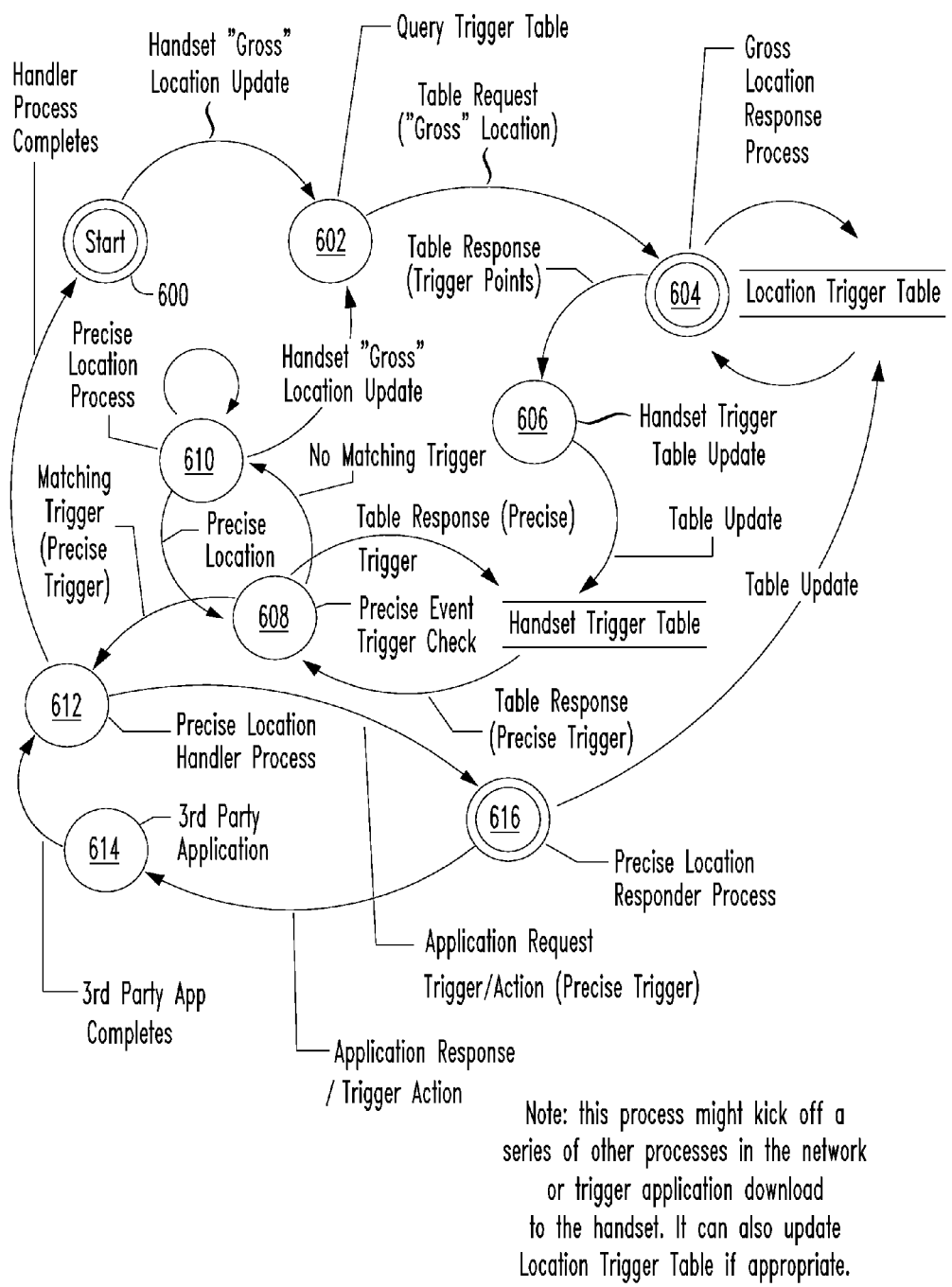
FIG. 6 shows a state diagram of the device based triggered push location event, in accordance with the principles of the present invention.

FIG. 6 shows a state diagram of the device based triggered push location event, in accordance with the principles of the present invention.

In particular, as shown in FIG. 6, in accordance with the invention, as shown by state 600, an application (e.g., a small application) is activated on the device that sends an LBS trigger 100 that requests download of "point of interest" trigger points based on changes in the current location, or "gross location", of the wireless device 113.

The request preferably not only includes the current location of the wireless device 113, since this is maintained by the device 113, but it also preferably includes a unique identifier of the device 113. The format of this tuple may be defined in any appropriate manner.

The device provided information is used to pre-fetch a table of location information points based on a device/user specified profile. As described, the table of location information points includes only those precise location information points X/Y coordinates within a proximity of the current location of the wireless device 113.

As the wireless device 113 traverses the network, the device 113 updates (tracks) precise location at the device level but does not need to communicate this data to the network. (This can be said to infer that assistance data has been downloaded, that precise location is enabled, etc.) The LBS application compares the current location X/Y of the wireless device 113 to currently held location information points (e.g., 310-312) to determine if/when to trigger an event at the wireless device 113 based on a proximity calculation between the current location X/Y of the wireless device 113 and the relevant location information point X/Y 310-312. In this embodiment, a match between the current location of the wireless device 113 and a stored location information point 310-312 results in a request to the serving network with a request to download relevant location information for that location. In this way, a specific trigger for download of location relevant information occurs only when a wireless device 113 first reaches a proximity of a given location information point. The appropriate trigger action is then taken, whether it is to download a location specific application, advertisement, coupon, game trigger event, blog, etc. to the handset. In this manner, the desired location specific event has been triggered by the device and executed while minimizing the amount of communications and data required for download to the handset.

Figure 7:
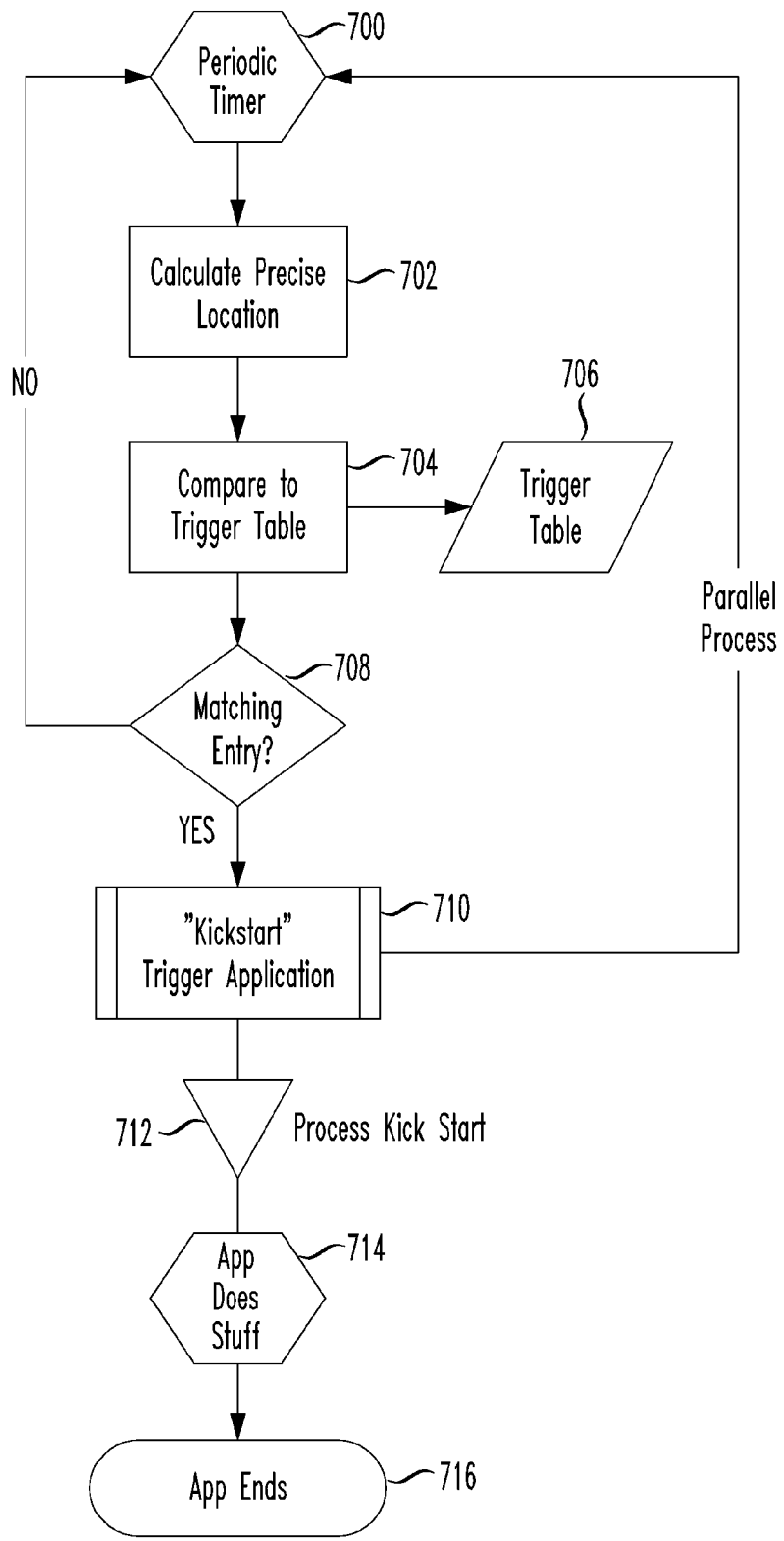
FIG. 7 shows a flow chart of exemplary device based triggered push location event, in accordance with the principles of the present invention.

FIG. 7 shows a flow chart of exemplary device based triggered push location event, in accordance with the principles of the present invention.

In particular, LBS triggers 100 may be generated when a significant change in location is detected by the wireless device 113. As shown in step 700 of FIG. 7, a periodic timer in the wireless device 113 occasionally determines if the current location of the wireless device 113 is within a proximate area of any location information points that have been previously downloaded to the wireless device 113. The idea is that the device is recalculating location periodically anyway, so the trigger can be based on time or some other factor such as motion, velocity, or user action.

In step 702, upon expiration of the timer, a current location of the wireless device 113 is determined.

In step 704, the current location of the wireless device 113 is compared to the X/Y longitude/latitude, plus any relevant proximate area surrounding each location information points, of any/all location information points (e.g., 310-312).

In step 706, the current location of the wireless device 113 is compared to a proximate area around each location information point stored in a local trigger table.

In step 708, it is determined if the current location of the wireless device 113 matched a given location information point. If not, the process sits idle until the timer in step 700 again times out.

However, if so, then the process proceeds to step 710, appropriate action is taken to present the associated location information to the user. The trigger could also kick off an entirely new application within the network, e.g., a tracking software application if a person of interest moves outside of a defined perimeter.

For example, specific text, video, or audio information may be requested for download from the location information database 150 at that time to the wireless device 113. This process of obtaining the location information, or kickstarting as shown in step 712, is referred to herein as a kickstart trigger application. This process may be a semaphore, though it need not be.

Note that the timer in step 700 continues to run and check matches with other location points, regardless of whether or not previously location information is being presented to the user (i.e., the location information may overlap).

In step 714, the handset or network application that is waiting for a trigger event to occur (i.e., a match to a location information point) is started, and does its independent processing. This may include location fixes, etc. that are also used for trigger evaluation. It is preferably an independent application that terminates upon completion according to its own rules.

In step 716, the LBS application ends.

The LBS application in the wireless device 113 can take the form of an applet (j2me), a BREW extension, a symbian application, or other coded logic that could be embedded or downloaded and executed on the device. In either case, the LBS application may be made available to other application developers to take advantage of a common XY downloadable table.

The applet table, or list of location information points, can include context when downloaded to the wireless device 113. This is similar to the XY table except that the table instead is a set of "tuples" that define specific characteristics useful to other applications. This information may include privacy settings, user, device info, location, speed, etc. that can be provided as part of the trigger to the network. Alternatively, a match between current location and a previously loaded location information point can be served by the downloaded application on the wireless device 113 if the specific actionable location based information has already been provided as part of a response to the LBS trigger 100.

The present invention is of particular use by developers to create applications that leverage location specific content for mobile users, with particular benefit in a proximity application.

While the invention has been described with reference to the exemplary embodiments thereof, those skilled in the art will be able to make various modifications to the described embodiments of the invention without departing from the true spirit and scope of the invention.

What is claimed is:

1. A wireless device location based service, comprising:
   a location based services (LBS) trigger module, in a given wireless device, to locally trigger retrieval of a plurality of point of interest (POI) information proximate to a predicted future position of said given wireless device;
   a culled memory module to cull said plurality of POI information into a future proximate sub-plurality of POI information based on a current path of travel, and speed, of said wireless device; and
   providing only said sub-plurality of POI information for display.

2. The wireless device location based service according to claim 1, wherein:
   said sub-plurality of said POI information is inversely proportional to said speed of said wireless device.

3. The wireless device location based service according to claim 1, wherein said POI information comprises:
   textual content.

4. The wireless device location based service according to claim 1, wherein said POI information comprises:
   audio content.

5. The wireless device location based service according to claim 1, wherein said POI information comprises:
   video content.

6. The wireless device location based service according to claim 1, wherein said POI information comprises:
   a pointer reference to uniquely identify a separate application.

7. The wireless device location based service according to claim 1, wherein said POI information comprises:
   a universal resource locator (URL) link.

8. A method of retrieving location based information in a wireless device, comprising:
   locally triggering, by said wireless device, retrieval of a plurality of point of interest (POI) information proximate to a predicted future position of a given wireless device;
   culling said plurality of POI information into a future proximate sub-plurality of POI information based on a current path of travel, and speed, of said given wireless device; and
   providing only said sub-plurality of POI information for display.

9. The method of retrieving location based information in a wireless device according to claim 8, wherein:
   said proximity is inversely proportional to said speed of said given wireless device.

10. The method of retrieving location based information in a wireless device according to claim 8, wherein said POI information comprises:
    textual content.

11. The method of retrieving location based information in a wireless device according to claim 8, wherein said POI information comprises:
    audio content.

12. The method of retrieving location based information in a wireless device according to claim 8, wherein said POI information comprises:
    video content.

13. The method of retrieving location based information in a wireless device according to claim 8, wherein said POI information comprises:
    a pointer reference to uniquely identify a separate application.

14. The method of retrieving location based information in a wireless device according to claim 8, wherein said POI information comprises:
    a universal resource locator (URL) link.

15. The method of retrieving location based information in a wireless device according to claim 8, further comprising:
    obtaining a unique identifier of said (liven wireless device.

16. The method of retrieving location based information in a wireless device according to claim 8, further comprising:

providing a unique identifier associated with said (liven wireless device prior to retrieval of said plurality of POI information.

\* \* \* \* \*